United States Patent [19]
Loesch et al.

[11] 3,881,631
[45] May 6, 1975

[54] MONITOR FOR AIR PRESSURE TYPE SEED PLANTER

[76] Inventors: Leo J. Loesch; Claude E. Loesch, both of Kimball, Minn. 55353

[22] Filed: Aug. 10, 1973

[21] Appl. No.: 387,320

[52] U.S. Cl. .................... 221/6; 111/1; 221/2; 221/211; 221/278
[51] Int. Cl. ............................................ B65g 15/02
[58] Field of Search ............... 116/67; 73/37; 111/1; 172/430; 221/2, 278, 211, 6, 7, 8

[56] References Cited
UNITED STATES PATENTS

| | | | |
|---|---|---|---|
| 993,437 | 5/1911 | Cole | 73/205 R |
| 1,087,930 | 2/1914 | Dodge | 73/205 R |
| 1,185,735 | 6/1916 | Trood | 73/205 R |
| 2,993,368 | 7/1961 | Schlein | 73/37 X |
| 3,422,776 | 1/1969 | Gregory, Jr. | 111/1 X |
| 3,457,691 | 7/1969 | Rogge | 221/278 X |
| 3,637,108 | 1/1972 | Loesch et al. | 221/211 |

*Primary Examiner*—Robert B. Reeves
*Assistant Examiner*—David A. Scherbel
*Attorney, Agent, or Firm*—H. Dale Palmatier; James R. Haller

[57] ABSTRACT

A seed planter which includes, in combination, a seed dispenser having a rotating, pressurized drum with openings in its periphery for carrying seeds, seed-carrying tubes which recieve seeds from the dispenser and which extend from the drum to carry seeds for planting, and self-monitoring monitors which sense the outward flow of air from the peripheral drum openings and the seed-carrying tubes, respectively. The monitors include vacuum transfer tubes each connected at one end to a respective vacuum indicator for visual readout through a sight-glass or the like, the other end of each vacuum transfer tube being positioned relative to the outward flow of air from the drum openings and the seed-carrying tubes respectively as to cause a vacuum to be drawn therein. The vacuum indicators thus indicate whether the seed-carrying tubes are obstructed, whether the seed supply in the drum has been depleted and whether the drum is rotating.

13 Claims, 3 Drawing Figures

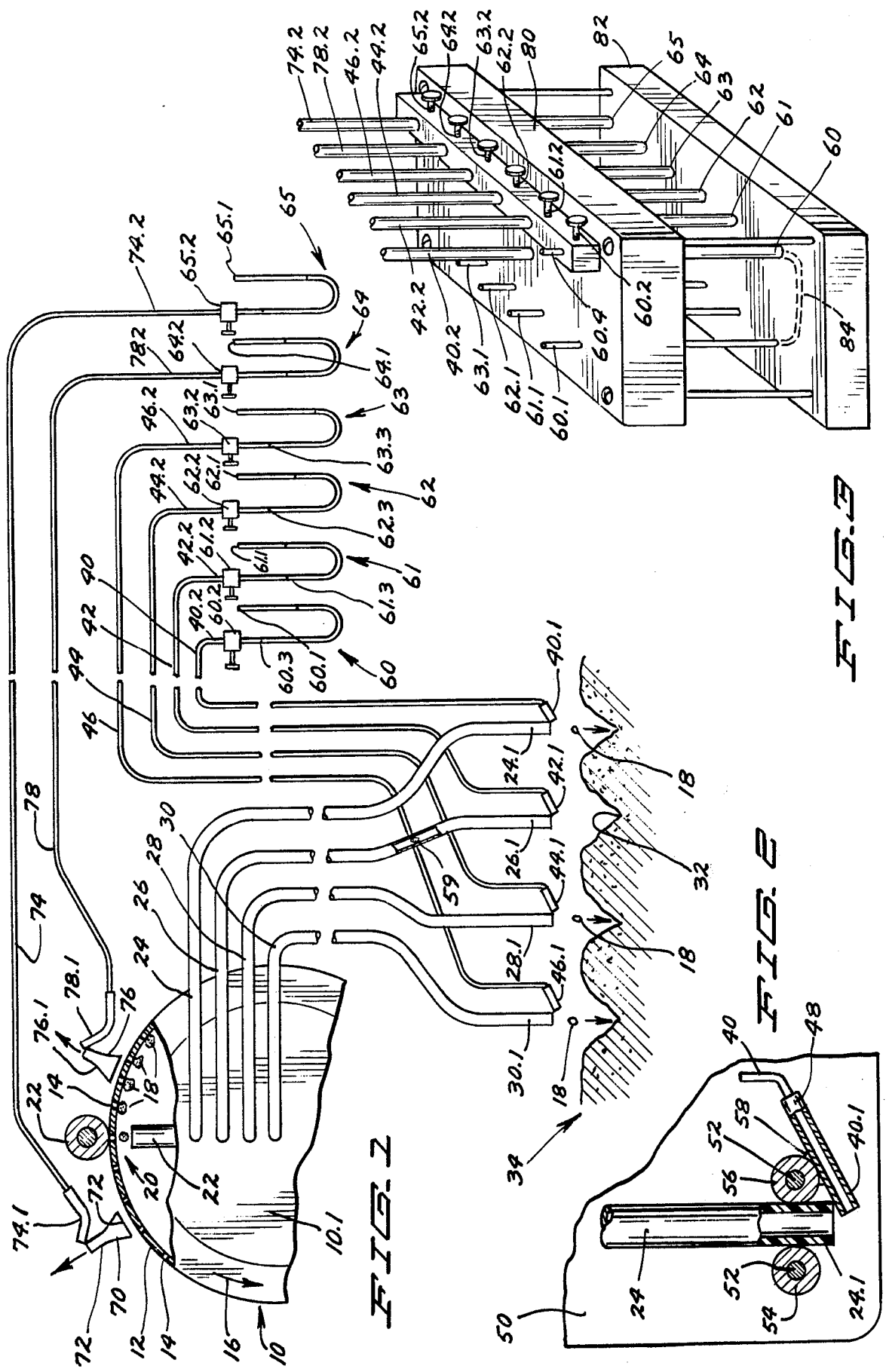

MONITOR FOR AIR PRESSURE TYPE SEED PLANTER

BACKGROUND OF THE INVENTION

An air pressure-type seed dispenser and planter for gently handling and planting seeds has been thoroughly described in our U.S. Pat. No. 3,637,108. Briefly, a revolving drum having openings in its periphery is provided with a supply of seeds and with air under superatmospheric pressure. Individual seeds are held in the peripheral openings by superatmospheric air as the drum rotates, carrying the seeds upwardly on the inner drum periphery. At a point in the rotation of the drum, the seeds are released from the openings into seed-conveying tubes, and are swept into and through the tubes by superatmospheric air from the drum to the crop row for planting.

In our co-pending application Ser. No. 342,611, we describe an operation monitor for monitoring the continuous flow of air from the seed-carrying tubes and from the drum openings. In said monitor, pressure transfer tubes are employed to convey air under pressure from the seed-carrying tubes and/or the drum openings to air pressure indicators. This operation monitor is accurate and quite reliable. Because the superatmospheric air within the drum of the seed planter may contain dust or other particulate matter which may eventually find its way into the pressure transfer tubes, the latter tubes must be periodically inspected and cleaned of dust to insure the continued free flow of air through the tubes.

SUMMARY OF THE INVENTION

Our present invention provides a seed planter with a monitor which cannot become fouled with dust or other matter issuing from the drum of the seed dispenser.

Briefly, the seed planter of the invention comprises, in combination, a seed dispenser and a monitor for detecting obstructions in the seed-carrying tubes or for determining whether the drum is rotating or whether the supply of seeds has become depleted in the drum, or any combination of these. The seed dispenser comprises a rotating drum containing superatmospheric air and a supply of seeds. Stationary seed-carrying tubes are each positioned to serially receive seeds from inner peripheral openings in the drum, and each seed-carrying tube has an exterior, seed-delivering end to which the seeds are swept by the superatmospheric air for planting.

A monitor for detecting obstructions in the seed-carrying tubes comprises vacuum indicators and vacuum transfer tubes, the latter each having one end positioned relative to a respective seed-carrying tube so as to produce a vacuum in the vacuum transfer tube in response to the sweep of superatmospheric air through the seed-carrying tube. The other ends of the transfer tubes communicate with respective vacuum indicators for visual readout of the vacuum produced in response to air flow through the respective seed-carrying tubes. Readout of a vacuum indicates that a respective seed-carrying tube is unobstructed.

An operation monitor is employed for detecting air flow outwardly through the peripheral drum openings. This monitor comprises a vacuum indicator, and a vacuum transfer tube having one end which is stationary and which is positioned in the air flow from a drum opening so that air flow through a drum opening produces a vacuum in the vacuum transfer tube. The other end of the vacuum transfer tube communicates with the vacuum indicator for visual readout of the vacuum so produced. As the seed-dispensing drum rotates, each of its peripheral openings passes a stationary seed-releasing station where the seeds are released from the openings into the seed-carrying tubes. The operation monitor may monitor the air flow of drum openings approaching the seed-releasing station, and the sensing of significant air flow through the approaching openings (by sensing a vacuum produced in the corresponding vacuum transfer tube) indicates that the openings have not been closed by seeds and that hence the seed supply in the drum has been depleted. Rotation of the drum is signaled by the detection of pulses of air through peripheral openings which have passed through and are departing from the seed-releasing station, the intermittent, or pulsating, air flow so detected representing air flowing outwardly from the openings as the latter sequentially pass and cause a vacuum to be drawn in the vacuum transfer tube.

BRIEF DESCRIPTION OF THE DRAWING

FIG. 1 is a partially schematic plan view of a seed planter of the invention, in partial cross section and partially broken away;

FIG. 2 is a plan view, partially broken away and in partial cross section, of the lower end of a seed-carrying tube as the same may be mounted on a carriage for use; and FIG. 3 is a perspective view of a bank of vacuum indicators employed in a seed planter of the invention.

DETAILED DESCRIPTION OF THE INVENTION

Referring to FIG. 1, a seed planter drum 10, of the type described in our U.S. Pat. No. 3,637,108, is provided with a periphery 12 having a plurality of openings 14 therethrough, and is provided with a supply of seeds, such as corn, and also with air under superatmospheric pressure. As the drum is rotated in the direction shown by arrow 16, seeds 18 come into contact with the peripheral drum openings and are held against the openings by the pressure differential afforded between the superatmospheric air within the drum and the atmospheric pressure outside of the drum. As the drum continues to rotate, the openings 14 pass a seed-releasing station 20 wherein a rubber roller 22 contacts the outer surface of the drum periphery to temporarily seal the openings 14. The pressure differential across the sealed openings is lost, and the seeds which are contained in the sealed openings fall or are blown into the upwardly extending ends 22 of the seed transfer tubes 24, 26, 28, 30. It will be understood that the periphery of the drum is provided with a series of circumferentially extending rows of openings; the drum depicted in FIG. 1 has four such rows of openings, and each row of openings deposits seeds one-by-one into the respective seedcarrying tubes 24, 26, 28, 30. The seeds which are carried by the openings ordinarily are irregular in shape (e.g., corn, etc.), and thus a small amount of air is permitted to escape through the openings 14 even though a seed is held thereagainst by the pressure differential across the drum periphery. The drum 10 is provided with a stationary wall 10.1 for supporting the seed-receiving ends of the seed-carrying tubes within the drum and in position to receive seeds released at the seed-releasing station 20. The end wall 10.1 also serves as a support for a chute (not shown) for adding seeds to the drum, and for an air line for supplying air under pressure to the drum.

The seed-carrying tubes 24, 26, 28, 30 extend from the drum outwardly and normally downwardly to terminate in seed-delivering ends 24.1, 26.1, 28.1, 30.1 closely adjacent furrows 32 previously formed in the earth 34. The seeds 18 are swept rapidly through the seed-carrying tubes by the flow of air generated by the superatmospheric pressure within the drum, and are deposited one-by-one in the furrows.

Extending into the air flow emanating from the ends 24.1, 26.1, 28.1, 30.1 of the seed-carrying tubes are the lower ends 40.1, 42.1, 44.1, 46.1 of vacuum transfer tubes 40, 42, 44, 46. The lower ends of the vacuum transfer tubes preferably are provided with a section of metal tubing 48 (FIG. 2). The seed-carrying tubes and the vacuum transfer tubes preferably are made of a flexible but self-supporting plastic, such as polyethylene, and the lower ends of the vacuum transfer tubes may be merely pushed into the metal tubes 48. The ends 24.1, etc., of the seed-carrying tubes may be held in position on the seed planter frame in the manner shown in FIG. 2 wherein a vertical plate 50 of the frame is held in spaced, parallel relationship with another plate (not shown) by bolts 52 passing through spacers 54 and 56, this assembly providing just enough space for the end 24.1 of a seed-carrying tube to be securely wedged and held between the plates and the spacers. The tubular metal end 48 of the vacuum transfer tube may be welded at 58 or otherwise affixed to one of the spacers 56 so that the angle subtended by the axes of the metal tube 48 and the seed-carrying tube end 24.1 may be pre-set.

With further reference to FIG. 2, the air which emanates from the end 24.1 of the seed-carrying tube 24 encounters the end 40.1 of the vacuum transfer tube 40. The air flow hence is increased in velocity in the vicinity of the vacuum transfer tube 40.1, and the pressure at this point of high air velocity is reduced in accordance with well known gaseous flow principles. This gaseous flow effect, for example, is employed in Venturi tubes, orifice meters, and the like which are used to measure gas flow rates. Care must be taken, of course, to insure that the air flowing through the end 24.1 of the seed-carrying tube does not impact directly upon the opening in the end 40.1 of the vacuum transfer tube. The angle between the axes of the metal tube 48 and the lower end 24.1 of the seed-carrying tube 24 may be pre-set, as noted above, so that a vacuum is produced in the vacuum transfer tube 40; this angle is acute, but may vary widely. Good results have been obtained when the angle is approximately 60°. It will be understood that other arrangements of the tubes 24 and 40 may also be employed to cause a vacuum to be drawn in the tube 40 in response to the flow of air through tube 24. For example, the tube 40 may pierce the wall of tube 24 so that a portion of the end of tube 40 protrudes into the air flow in tube 24. Tube 24 may be provided with a Venturi-like constricture at a point along its length, and the vacuum transfer tube 40 may be connected to the tube 24 at the point of constricture to measure the reduced absolute pressure at that point. The end-to-end relationship of the tubes 24 and 40, as shown in FIG. 2, is preferred for simplicity of design and ease of use.

The other ends 40.2, 42.2, 44.2, 46.2 of the vacuum transfer tubes are connected respectively to vacuum indicators 60, 61, 62, 63 to provide a visual indication of the vacuum drawn in the vacuum transfer tubes. Each of the indicators comprises a U-shaped glass tube, one end (60.1, 61.1, 62.1, 63.1) of which communicates with the atmosphere and the other end of which communicates with the end of a respective vacuum transfer tube through an adjustable bleeder valve (60.2, 61.2, 62.2, 63.2). The latter may be a needle valve adapted to bleed regulated quantities of air into the vacuum transfer tubes. The U-shaped tubes are partially filled with a liquid, the level of which is observable through the glass walls of the tubes. The magnitude of the vacuum drawn in the respective vacuum transfer tubes is thus mirrored in the difference in the liquid level in the upstanding arms of the U-shaped tubes.

In FIG. 1, the seed transfer tubes 24, 28 and 30 are operating freely, and the air flow therethrough produces a vacuum in vacuum transfer tubes 40, 44 and 46, which vacuum is visually indicated by the liquid levels 60.3, 62.3 and 63.3 in U-tubes 60, 62, and 63. In seed-carrying tube 26, however, an obstruction 59 has developed so that little if any air flow occurs through this tube. As a result, no vacuum is produced in vacuum transfer tube 42, and no change in the liquid level 61.3 in the U-tube is observed, thus indicating to the operator that the seed-carrying tube 26 is inoperative.

A stationary air collection funnel 70 (FIG. 1) is positioned over the openings in the periphery of the drum to collect air issuing therefrom, the funnel 70 in FIG. 1 being positioned to collect air from those drum openings which are departing from the seed-releasing station 20 as the drum revolves. The funnel 70 extends across the width of the drum so as to collect air issuing from the openings in an axial row in the drum periphery, although if desired the funnel may be adapted to collect air issuing from only a single aperture. The mouth 72 of the funnel extends circumferentially of the drum for a distance greater than the diameter of a single opening, but less than the circumferential distance separating two adjacent openings. The walls of the funnel 70 converge into a neck 72 from which the collected air flows to the atmosphere. As the drum revolves, the air flow into the funnel from a single axial row of drum openings will continue so long as these openings are in line with the funnel mouth opening 72. A stationary vacuum transfer tube 74 is provided with an end 74.1 which is positioned adjacent the neck 72 of the funnel and at an acute angle with respect to the direction of air flowing therefrom so that a vacuum is produced in the air transfer tube in the same manner as stated above. The other end 74.2 of the vacuum transfer tube is connected to a vacuum indicator 65 of the type described above, the latter comprising a U-shaped glass tube having an open end 65.1 communicating with the atmosphere and another end which communicates with the end 74.2 of the vacuum transfer tube through an adjustable bleeder valve 65.2. The U-shaped tube contains a quantity of liquid visible through its walls such that the difference in the liquid level in the two arms of the U-shaped tube indicates the presence of a vacuum in the vacuum transfer tube 74. The pulses of air which are emitted from the neck 72 of the air collection funnel 70 as an axial row of drum openings passes beneath the funnel produces a vacuum in the vacuum transfer tube 74 which is then reflected by a change in the liquid level in the upstanding arms of the U-shaped tube. As the row of openings in the drum periphery are carried out of alignment with the funnel 70, air ceases to flow from the funnel neck 72, the vacuum in the vacuum transfer tube 74 is lost, and the level of the liquid in the upstanding arms of the vacuum indicator 65 tends to equalize. Continued rotation of the drum hence produces a cycling of the liquid level in the indicator 65. If the drum ceases to rotate, the cycling of the liquid level in indicator 65 likewise stops, indicating to the operator that the seed planter has ceased to operate.

A second stationary funnel 76, which may be identical to funnel 70, is positioned adjacent the periphery of the drum so as to collect air issuing from openings approaching the seed-releasing station 20. A vacuum transfer tube 78, identical to transfer tube 74, is provided with an end 78.1 which extends into the air flow from the neck 76.1 of the funnel 76 so that a vacuum may be drawn in the transfer tube 78 and communicated to its other end 78.2 which in turn communicates through bleeder valve 64.2 with vacuum indicator 64. The latter indicator may be identical to indicator 65. As noted above, a small amount of superatmospheric air in the drum escapes past the seeds 18 which are held against the drum openings, but the resultant air flow through the openings is negligible and produces little air flow through the neck 76.1 of the funnel 76 and accordingly produces little if any vacuum in vacuum transfer tube 78. Hence, when the seed planter of the invention is normally operating, little if any difference in the level of the liquid in the two upstanding arms of indicator 64 is ordinarily observed. However, should the supply of seeds in the drum be depleted, the peripheral drum openings approaching the seed-releasing station 20 will be empty, whereupon the superatmospheric air passing through such openings without obstruction will cause a significant vacuum to be produced in the vacuum transfer tube 78 and will be indicated by a difference in the levels of the liquid in the upstanding arms of the indicator 64. As the drum continues to rotate, the liquid level in the upstanding arms of the indicator will oscillate as axial rows of empty drum openings pass into and out of alignment with the funnel 76. Hence, oscillation of the liquid level in the indicator 64 indicates to the operator that the supply of seeds in the drum has been greatly depleted or exhausted.

Referring to FIG. 3, the U-shaped indicators 60–65 preferably are mounted together between top and bottom supporting blocks 80 and 82 for easy visualization by the operator. In a preferred embodiment, the bottom block 82 is journaled to receive the upstanding arms of the U-shaped tubes, and is provided with a series of lateral channels 84 which form connections between the bottom ends of each pair of upstanding arms. The upper block 80 is provided with a bank of bleeder valves, each of which communicates with one of the upstanding arms of each of the U-shaped tubes and each of which is provided with an adjustment knob. Protruding from the bleeder valve bank are nipple connections, one of which, 60.4, is shown in FIG. 3. The ends of the vacuum transfer tubes 40.2, 42.2, 44.2, 46.2, 78.2, 74.2 are adapted to fit over the nipples so that the bank of indicators may easily be detached from the vacuum transfer tubes for cleaning or the like. Also extending through the upper surface of the upper block 80 are the ends 60.1–60.5 of the upstanding legs of the indicators which communicate with the atmosphere. When the seed planter is operated, it is convenient to have the liquid levels in each of the U-shaped indicator tubes set at the same height (with the exception of indicator 65, in which the liquid level oscillates) so that any deviation in the vacuum in one of the vacuum transfer tubes may be easily and quickly noticed. The bleeder valve adjustment permits the height of the liquid level in each of the indicators to be equalized to a large extent; however, since the U-shaped indicators 60, etc., do not communicate with one another, additional quantities of liquid may be introduced through their open ends 60.1, etc., so that gross changes in the liquid levels in the tubes may be affected.

Because vacuum, rather than superatmospheric pressure, is induced in the vacuum transfer tubes 24, etc., little if any dust tends to accumulate in these tubes, and the tubes remain clear and open. Moreover, the ends 40.1, etc., of the vacuum transfer tubes which are adjacent the lower ends 24.1, etc., of the seed-carrying tubes need not protrude greatly into the air flowing from the latter tube. The adjacent ends of the seed-carrying tubes and vacuum transfer tubes may touch, as shown in FIG. 2, or may be spaced apart a short distance. In any event, the ends 40.1, etc., of the vacuum transfer tubes are so positioned relative to the ends 24.1, etc., of the seed-carrying tubes so as not to substantially hinder or obstruct free passage of seeds from the latter tubes.

Manifestly, we have provided a pressure type seed planter with a monitoring system which senses the flow of superatmospheric air, which is simple to fabricate and install, and in which dust or other particulate matter does not tend to accumulate.

While we have described a preferred embodiment of the present invention, it should be understood that various changes, adaptations, and modifications may be made therein without departing from the spirit of the invention and the scope of the appended claims.

What is claimed is:

1. In combination, a seed dispenser comprising a rotating drum containing superatmospheric air and a supply of seed, and including stationary seed-carrying tubes each positioned to serially receive seeds from inner peripheral apertures in the drum and each seed-carrying tube having an exterior, seed-delivering end to which the seeds are swept by the superatmospheric air for planting, and a continuously acting monitor for detecting air flow in the seed-carrying tubes so as to indicate obstructions therein and comprising vacuum indicators and vacuum transfer tubes, the latter each having one end positioned relative to a respective seed-carrying tube as to produce a vacuum in the vacuum transfer tube in response to the sweep of superatmospheric air through the seed-carrying tube, the other end of each transfer tube communicating with a vacuum indicator for continuous visual readout of the vacuum so produced.

2. The combination of claim 1 wherein said one end of each vacuum transfer tube is positioned adjacent the seed-delivery end of a respective seed-carrying tube for production of a vacuum in the vacuum transfer tube in response to the issuance of superatmospheric air from the seed-carrying tube.

3. The combination of claim 1 wherein each vacuum indicator comprises a separate U-shaped tube having a liquid therein, the level of which is visible through the tube walls, one end of the U-shaped tube communicating with a respective vacuum tube and the other end communicating with the atmosphere.

4. The combination of claim 3 wherein the one end of each U-shaped tube includes an adjustable bleeder valve providing communication between the vacuum transfer tube and the atmosphere, whereby the liquid level in the U-tube may be adjusted by adjustment of the bleeder valve.

5. In combination, a seed dispenser comprising a rotating drum having seed-carrying apertures through its periphery and containing a supply of seeds and superatmospheric air, stationary seed-carrying tubes each positioned to serially receive seeds from the apertures at a stationary seed-releasing station, those apertures approaching the seed-releasing station being closed by seeds and those apertures departing therefrom being open, each seed-carrying tube having exteriorly of the drum a seed-delivering end to which seeds are serially swept by the superatmospheric air for planting, a continuously acting operation monitor for detecting air flow outwardly through the peripheral drum apertures and comprising a vacuum indicator and a vacuum transfer tube having one end which is stationary and positioned in the air flow from drum apertures to produce a vacuum in the transfer tube, the other end of the transfer tube communicating with the vacuum indicator for continuous visual readout of the vacuum so produced.

6. The combination of claim 5 wherein said one end of the vacuum transfer tube is positioned in the air flow from apertures approaching the seed-releasing station, whereby an indication of vacuum in the transfer tubes signals that such apertures have not been closed by seeds, and hence that the seed supply within the drum has been depleted.

7. The combination of claim 5 wherein said one end of the vacuum transfer tube is positioned in the air flow from apertures departing from the seed-releasing station, whereby regular fluctuations in the vacuum indicated by the vacuum indicator signal rotation of the drum.

8. The combination of claim 5 wherein the operation monitor is provided in duplicate, the two monitors detecting air flow from peripheral drum apertures respectively approaching and departing from the seed-releasing station.

9. The combination of claim 5 including a stationary air flow collection funnel adapted to collect air issuing from the drum apertures as the apertures are carried by the rotating drum through a circumferential distance greater than that of the diameter of a single aperture, and having an opening through which the collected air is funneled, the one end of the vacuum transfer tube being positioned in the flow of collected air from the funnel.

10. In combination, a seed dispenser comprising a rotating drum having seed-carrying apertures through its periphery and containing a supply of seeds and superatmospheric air, stationary seed-carrying tubes each having one end positioned to serially receive seeds from the apertures at a stationary seed-releasing station, those apertures approaching the seed releasing-station being closed by seeds and apertures departing therefrom being open, each seed-carrying tube extending outwardly of the drum and terminating in a seed-delivering end to which seeds are serially swept by the superatmospheric air for planting, a continuously acting obstruction detecting monitor for detecting obstructions in the seed-carrying tubes comprising vacuum indicators and vacuum transfer tubes, the latter each having one end positioned adjacent the seed-delivery end of a respective seed-carrying tube for production of a vacuum in the vacuum transfer tube in response to the issuance of superatmospheric air from the seed-carrying tube, the other end of each transfer tube communicating with a separate vacuum indicator for continuous visual readout of the vacuum so produced, and a pair of continuously acting operation monitors for detecting air flow outwardly from peripheral drum apertures respectively approaching and departing from the seed-releasing station, each operation monitor comprising a vacuum indicator, an air collection funnel adapted to collect air issuing from the drum apertures as the latter traverse a circumferential distance less than that between adjacent apertures and having an opening through which the collected air is funneled, and a vacuum transfer tube, one end of which is positioned in the air flow emanating from the funnel and responsive thereto to produce a vacuum in the transfer tube, the other end of the transfer tube communicating with the vacuum indicator, whereby, upon viewing all of the vacuum indicators, an operator may continuously determine whether the seed planter is operating, whether the seed supply has been deleted, and whether the seed-carrying tubes are obstructed.

11. The combination according to claim 10 wherein each vacuum indicator is separate from each other indicator and comprises a U-shaped tube having a liquid visible through its walls, one end of the tube communicating with a respective vacuum transfer tube, and the other end of the U-shaped tube communicating with the atmosphere.

12. In combination, a seed dispenser comprising a rotating drum containing air under superatmospheric pressure and a supply of seeds and having a periphery with apertures therein for carrying seeds, and including seed-carrying tubes positioned to receive seeds from the apertures and having exteriorly extending ends through which the seeds are swept by the superatmospheric air through the tubes for planting, the apertures not filled by seeds and the seed-carrying tube ends serving as ports through which flows superatmospheric air from the drum, and a continuously acting monitor for detecting the flow of air from a given port comprising a vacuum transfer tube having one end positioned relative to the air flow from the latter port so as to product a resulting vacuum in the vacuum transfer tube, the other end of this tube communicating with a vacuum indicator for continuous visual readout of the vacuum so produced.

13. In combination, a seed dispenser comprising a rotating drum having seed-carrying apertures through its periphery and containing a supply of seeds and superatmospheric air, stationary seed-carrying tubes each positioned to serially receive seeds from the apertures at a stationary seed-releasing station, those apertures approaching the seed-releasing station being closed by seeds and those apertures departing from the station being open, each seed-carrying tube having exteriorly of the drum a seed-delivering end to which seeds are serially swept by the superatmospheric air for planting, a continuously acting operation monitor for detecting air flow outwardly through the peripheral drum apertures and comprising a vacuum indicator, a stationary air flow collection funnel positioned to collect air issuing from the drum apertures as the apertures are carried by the rotating drum through a circumferential distance greater than that of the diameter of a single aperture and having an opening through which the collected air is funneled, and a vacuum transfer tube having one end positioned in the air flow from the collection funnel to produce a vacuum in the transfer tube, the circumferential distance traversed by an aperture during which air is collected from the aperture by the collection funnel being less than the circumferential distance between two adjacent apertures, the other end of the transfer tube communicating with the vacuum indicator for continuous visual readout of the vacuum thus produced.

* * * * *